United States Patent
Sluiman

(10) Patent No.: US 7,647,584 B2
(45) Date of Patent: Jan. 12, 2010

(54) AUTOMATION AND ISOLATION OF SOFTWARE COMPONENT TESTING

(75) Inventor: Harm Sluiman, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 1662 days.

(21) Appl. No.: 09/772,650

(22) Filed: Jan. 30, 2001

(65) Prior Publication Data
US 2002/0133807 A1    Sep. 19, 2002

(30) Foreign Application Priority Data
Nov. 10, 2000    (CA) .................................. 2325684

(51) Int. Cl.
*G06F 9/44*    (2006.01)
(52) U.S. Cl. .................... 717/124; 717/125; 717/126; 717/118; 717/114
(58) Field of Classification Search ............. 707/103 R; 717/136.101, 107, 125, 126, 118; 714/46.38; 704/8; 345/866
See application file for complete search history.

(56) References Cited

U.S. PATENT DOCUMENTS

| | | | | |
|---|---|---|---|---|
| 5,652,835 A * | 7/1997 | Miller | .......................... | 714/38 |
| 6,023,271 A * | 2/2000 | Quaeler-Bock et al. | ..... | 345/866 |
| 6,237,135 B1 * | 5/2001 | Timbol | ........................ | 717/107 |
| 6,275,790 B1 * | 8/2001 | Yamamoto et al. | ............. | 704/8 |
| 6,405,364 B1 * | 6/2002 | Bowman-Amuah | ......... | 717/101 |
| 6,567,973 B1 * | 5/2003 | Yamamoto et al. | .......... | 717/136 |
| 6,587,969 B1 * | 7/2003 | Weinberg et al. | ............. | 714/46 |
| 6,604,209 B1 * | 8/2003 | Grucci et al. | ................. | 714/38 |
| 6,633,888 B1 * | 10/2003 | Kobayashi | .............. | 707/103 R |

OTHER PUBLICATIONS

Kenneth Nagin et al. TCBeans Software Test Tool Kit, Nov. 1998, IBM, p. 1-9.*
Glen MacCluskey, Using Java Reflection, Jan. 1998, Sun, p. 1-8.*

* cited by examiner

*Primary Examiner*—Insun Kang
(74) *Attorney, Agent, or Firm*—Hamilton & Terrile, LLP; Stephen A. Terrile

(57) ABSTRACT

A system for the testing of a software component API includes the generation of a wrapper component. The wrapper component is generated by determining the interface of the software component and by mirroring that interface in the public interface of the wrapper. The wrapper methods delegate to the software component API. Test code is included within the wrapper component to permit capture and playback of interaction with the software component API. Test case software accesses the software component API through the wrapper. The wrapper both generates trace data based on the interaction between the test case and the software component and delegates to the software component API.

8 Claims, 1 Drawing Sheet

AUTOMATION AND ISOLATION OF SOFTWARE COMPONENT TESTING

BACKGROUND OF THE INVENTION

1. Field of the Invention

The present invention is directed to an improvement in computing systems and in particular to the automation and isolation of software component testing.

2. Description of the Related Art

In the development of large computer systems, modules or components are defined and implemented by computer code. The use of object oriented programming languages such as Java and C++ and the adoption of component environments that support the CORBA, Microsoft COM or Java Bean architectures has resulted in component-based system development becoming more common. Java is a trademark of Sun Microsystems.

As such component development becomes more prevalent, it is becoming increasingly important to be able to test and validate such software components at an API (interface) level. Certain testing of components may be, and frequently is, carried out by incorporating test code (also referred to as instrumentation or instrumentation code) in the module or component being tested. However, for the testing of a component to be as rigorous as possible and to provide the most reliable results, it is desirable to test component code at the API level without special testing code being embedded in the component. Such software, without added testing code, is known as "production level code" or "production binaries".

Testing of production level code is popular for graphical user interface (GUI) testing. Software to carry out such testing of graphical interfaces is known as GUI capture and playback tooling. This type of prior art system records user interaction with the GUI (such as mouse clicks and keystrokes) and makes the recorded user-GUI interaction available for repeated test cases. Examples of commercially available systems which include GUI capture and playback tooling are the WinRunner™ product from Mercury Interactive Corp., the Silktest™ product from Segue Software Inc. and the Rational Robot™ product from Rational Software Corp.

The GUI capture and playback tooling found in prior art systems is not typically adapted to test API interfaces that are not graphical in nature. Certain prior art systems have provided for capture and playback tooling for non-graphical interfaces but such systems have built the capture functionality into the test case component of the system. Such an approach is relatively inflexible in that reuse and modification of the test case is cumbersome. The test case is tied closely to the component being tested in such systems.

Such non-graphical interfaces are important in distributed systems found in component-based architectures. As a result, a system to capture API interface interaction, that does not include code within the components or modules being tested, is desirable.

Furthermore, where extensive testing is carried out on software components, it is desirable to have testing tooling that will permit tests to be developed with a minimum of direct developer input. It is therefore desirable to have a test system that will automate the process to be carried out in capturing component API interaction in a test system.

SUMMARY OF THE INVENTION

According to an aspect of the present invention, an improved testing tool is provided for the automation and isolation of software component testing.

According to another aspect of the invention, a method is provided for testing a software test component, the method including the steps of ascertaining the public interface of the test component, and creating a wrapper component for the test component by (i) defining a wrapper component interface to mirror the test component interface, (ii) defining the wrapper component to delegate to the test component by including calls to the test component interface within the wrapper component, (iii) inserting test code within the wrapper component to permit capture and playback of user interaction with the interface of the test component, and (iv) enabling a test case to use the interface of the wrapper component to access the test component and to generate test data from the test code in the wrapper component. The test component may be an object-oriented software test component and the step of ascertaining the public interface of the test component may include interrogating the test component definition to determine the public methods, constructor and associated parameters for the test component. The test component may be a Java language class and the step of interrogating the test component definition may include use of the introspection group of interfaces in the Java Bean specification. Further, the step of defining a wrapper component interface may include defining public methods, constructors and associated parameters in the wrapper component to mirror the public methods, constructors and parameters ascertained for the test component.

According to another aspect of the invention, a computer program product is provided for testing software components, the computer program product including a computer usable medium having computer readable code means embodied in the medium, including computer readable program code means for carrying out the method described above.

According to another aspect of the invention, a. computer system is provided for the generation of a test environment for a software test component, the system including means for ascertaining the public interface of the test component, and means for creating a wrapper component for the test component by (i) means for defining a wrapper component interface to mirror the public interface of the software test component, (ii) means for defining the wrapper component to delegate to the test component by including calls to the test component interface within the wrapper component, and (iii) means for making the wrapper component available to permit test code to be inserted within the wrapper component to permit capture and playback of user interaction with the interface of the test component and to permit a test case component to use the interface of the wrapper component to access the test component and to generate test data from the test code in the wrapper component. Preferably, the test component is an object-oriented software test component and the means for ascertaining the public interface of the test component includes means for interrogating the test component definition to determine the public methods, constructor and associated parameters for the test component. Preferably, the means for defining a wrapper component interface includes means for defining public methods, constructors and associated parameters in the wrapper component to mirror the public methods, constructors and parameters ascertained for the test component.

Advantages of the present invention include the generation of a library that can be created to easily capture component interface interaction which in turn can be used to create test cases that re-create the same execution pattern along with customizable verification capability. Capture and playback capability is provided without requiring special code in the production binaries. In addition, this approach allows for the migration of manually created test cases to a generated set of test cases with little effort on the part of the test case owner.

DESCRIPTION OF THE PREFERRED EMBODIMENT

Figure 1:
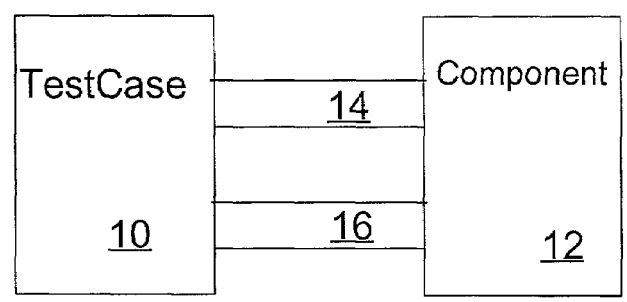
FIG. 1 is a block diagram showing a sample interaction between a test case component and a component for testing according to the prior art.

FIG. 1 is a block diagram showing a test case 10 and a component 12. The interaction between the test case 10 and the component 12 is shown in FIG. 1 by an API having call and return pairs 14, 16. In the description of the preferred embodiment, example components are described in simplified Java language code, as set out below. The preferred embodiment is able to be implemented in environments such as those supporting Java Bean, Microsoft COM, and CORBA architectures. It will also be understood by those skilled in the art that components or modules in other programming languages and environments may similarly make use of the preferred embodiment, with the appropriate modifications to allow for language or environment-specific constraints.

The component 12 shown in FIG. 1 is a component or module having a defined functionality and a defined API that requires testing. The example of FIG. 1 shows a simple test system in which the test case 10 interacts with the component 12 by the component 12 API. In the prior art system shown in FIG. 1, test code or instrumentation is included within the component 12. The test code generates test or trace data that records the interaction between the test case 10 and the API of the component 12 (as shown by the call and return pairs 14, 16). The test data generated by the test code with the component 12 is available to be used to debug and refine the component 12. Information about a specific operation within the component 12 that is used by the test case 10, and the values of objects returned or used as parameters, is made available by the test or trace data generated by the test code included within the component 12.

The test code in the component 12 is able to generate trace data analogues to the GUI capture data referred to above. As is set out above, however, the test code must be removed from the component 12 to generate the production binaries or production level code. This presents problems in quality assurance as the code being used in the production environment (without the test code) differs from the code tested (the version having the test code within the component).

A simplified example of modified Java code that illustrates the interaction between the test case 10 and the component 12 is provided using the Person test component and the TestPerson test case component defined below in Examples 1 and 2:

---
EXAMPLE 1
---

```
Person.java
package com.mypackage;
public class Person
{
private String name;
public void setName(String n)
{
    // Test code potentially embedded here
    reallySetName(n);
    // Test code potentially embedded here
}
public String getName( )
{
    // Test code potentially embedded here
    return name;
    // Test code potentially embedded here
}
private void reallySetName(String n)
{
    name = n;
}
}
```

The test component Person of Example 1 has a simple API that includes the public methods setName( ) and getName( ). As is indicated in the commented lines in Example 1, test code may be included in the method definitions in the component defined in the example. This test code is able to carry out the capture function to generate test data permitting a capture and playback test for the Person component. In the production level code, there will be no test tooling in the Person component. The commented lines will be replaced by test code, however, when in-line testing is being carried out on the Person component.

A simple test case (TestPerson) for the Person component of Example 1 is given in the following example code:

---
EXAMPLE 2
---

```
TestPerson.java
import com.mypackage.*;
public class TestPerson
{
    public static void main(String args[ ])
    {
        TestPerson me = new TestPerson( );
        me.doit( );
    }
    public void doit( )
    {
        Person myPerson = new Person( );
        myPerson.setName ("me");
        System.out.println(myPerson.getName( ));
    }
}
```

The test case component TestPerson of Example 2 calls the component methods setName( ) and getName( ) of component Person. The test code within Person may be written to capture the API interaction of the test case with the component being tested. In terms of FIG. 1, TestPerson is represented by the test case 10, and component Person is represented by the component 12. The API being tested is the setName( ), getName( ) public method interface and this is shown in FIG. 1 by the call and return pairs 14, 16, respectively.

Figure 2:
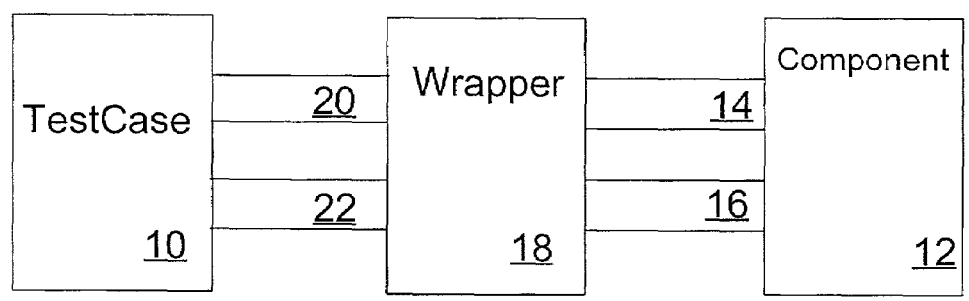
FIG. 2 is a block diagram showing a sample interaction between a test case, a component for testing and a wrapper component, according to the preferred embodiment.

The testing environment of the preferred embodiment is shown by example in the block diagram of FIG. 2 and in the modified Java code of Example 3. FIG. 2 shows the component 12 and the test case 10. A new component is created by the preferred embodiment and is shown in FIG. 2 as a wrapper 18. The wrapper 18 is a component generated by gathering the interface of the component 12 through reflection. The wrapper 18 uses a delegation pattern to the component 12. In other words, the details of the public interface (API) of component 12 is ascertained by the preferred embodiment and the component wrapper 18 is constructed by the preferred embodiment to have the same interface as the component 12.

With reference to FIG. 2, the interface (or API) of the component 12 is again shown as the call and return pairs 14, 16. The wrapper 18 is shown with an interface that mirrors that of the component 12, where call and return pairs 20, 22 match the call and return pairs 14, 16. The wrapper 18 is defined such that a call from the test case 10 using the call 20 is delegated and will therefore result in the call being passed to the component 12 by the call 14 (returned values will follow the same route, in reverse). Similarly, a call to the wrapper 18 by the test case 10 via the call 22 results in a call to the component 12 using the call 16 (and a similar return path, in reverse).

The following modified Java code example indicates how a wrapper component as shown in FIG. 2 may be implemented for the Person component defined above in Example 1.

---

EXAMPLE 3

```
Person.java
package testable.com.mypackage;
import com.mypackage.*;
public class Person
{
private com.mypackage.Person iPerson;
public Person( )
{
        iPerson = new com.mypackage.Person( );
}
public void setName(String n)
     //    Test code potentially embedded here
          iPerson.setName(n);
     //    Test code potentially embedded here
}
public String getName( )
{
     //    Test code potentially embedded here
          return iPerson.getName( );
     //    Test code potentially embedded here
}
}
```

---

The wrapper code for the Person component shown in Example 3 includes methods which call the API of the Person component shown in Example 1, above. The wrapper component itself is defined to have an API which is the same as the Person component API. In this way, the TestPerson component defined in Example 2 is able to call wrapper component (defined in Example 3) using the same code that TestPerson used to call the original Person component. The difference in calling the wrapper component from the test case is that the wrapper component package is imported into the TestPerson package. The result is that TestPerson carries out the same steps as was the case without a wrapper, but the calls to Person take place through the wrapper component. The wrapper component operates as a proxy for the test component.

As may be seen by the comments included in the code of Example 3, test instrumentation may be included in the wrapper component. The construction of a wrapper component by preferred embodiment therefore permits the API of component Person to be tested by including test code in the wrapper component. The API calls relating to the Person component may be captured for replay without including code in the production binaries of Person.

The generation of the wrapper 18 shown in FIG. 2 is automated in the preferred embodiment. The API of the component 12 may be determined, where appropriate, using tools such as the introspection group of interfaces in the Java Bean specification. Such tools permit a wrapper generator to ascertain the public methods and constructors in the test component and as well as those parameters that are associated with them. This information is used to define the wrapper which defines proxy classes for the API of the component being tested. Delegation code is generated for the wrapper's proxy classes to pass calls through to the component being tested. The details of the wrapper-generating component will vary for different programming environments. However, those skilled in the art will appreciate that once the API of the component to be tested is determined, the generation of a proxy component with delegated calls to that API will be straightforward and may be automated.

As is described above, the use of a wrapper component provides for the isolation of the test component. The interface or API of the test component is able to be tested and the test code is isolated from the test component itself by use of the wrapper component. The wrapper component contains the test code to permit capture and playback of interaction with the interface of the test component. Similarly, the generation of the wrapper component is able to be automated by use of tools for determining the public interface or API of the test component. In this way, the preferred embodiment provides for both isolation and automation of the testing of an API for a test component.

The preferred embodiment also provides for the testing of the API to itself be subject to automated test case generation. As is described above, test data (or trace data) is generated by the test code found in the wrapper component. Once the trace data is made available to testing software, further test cases may be automatically generated for use on the test component. In this way, the preferred embodiment is able to be used in conjunction with existing testing software to automate the generation of test cases for the component being tested.

Although a preferred embodiment of the present invention has been described here in detail, it will be appreciated by those skilled in the art that variations may be made thereto without departing from the spirit of the invention or the scope of the appended claims.

The embodiments of the invention in which an exclusive property or privilege are claimed are defined as follows:

1. A method for testing a software test component, said method comprising the steps of:
   ascertaining a public interface of the software test component; and
   creating a wrapper component for the software test component by the substeps of
      defining a wrapper component interface to mirror the public interface of the software test component and to receive calls to the software test component, defining the wrapper component to delegate to the software test component by including calls to the public interface of the software test component within the wrapper component, inserting test code within the wrapper component to permit capture and playback of user interaction with the public interface of the software test component, and
      enabling a test case to use the wrapper component interface to pass the received calls to the software test component and to generate test data from the test code in the wrapper component.

2. The method for testing a software test component according to claim 1, wherein the software test component is an object-oriented software test component and wherein said step of ascertaining the public interface of the software test component further comprises interrogating a test component definition to determine public methods, constructor and associated parameters for the software test component.

3. The method for testing a software test component according to claim 2, wherein the test component is a Java language class and said ascertaining step further comprises use of an introspection group of interfaces in a Java Bean specification.

4. The method for testing a software test component according to claim 2, wherein the substep of defining a wrapper component interface further comprises defining public methods, constructors and associated parameters in the wrapper component to mirror the public methods, constructors and parameters determined for the software test component.

5. A computer memory storing logic for testing software components, the logic comprising:
first logic for ascertaining a public interface of a software test component; and second logic for creating a wrapper component for the software test component, said second code means comprising
logic for defining a wrapper component interface to mirror the public interface of the software test component,
logic for defining the wrapper component to delegate to the software test component by including calls to the public interface of the software test component within the wrapper component,
logic for inserting test code within the wrapper component to permit capture and playback of user interaction with the public interface of the software test component, and
logic for enabling a test case to use the wrapper component interface to access the software test component and then to generate test data from the test code in the wrapper component.

6. A system in a computing environment for generation of a test environment for a software test component, said system comprising:
means for ascertaining a public interface of the software test component; and
means for creating a wrapper component for the software test component, said creating means including
means for defining a wrapper component interface to mirror the public interface of the software test component,
means for defining the wrapper component to delegate to the software test component by including calls to the public interface of the software test component within the wrapper component, and
means for making the wrapper component available to permit test code to be inserted within the wrapper component to permit capture and playback of user interaction with the public interface of the software test component and to permit a test case component to use the wrapper component interface to pass data to the software test component and to generate test data from the test code in the wrapper component.

7. The system for generation of a test environment according to claim 6, wherein the software test component is an object-oriented software test component and said
means for ascertaining the public interface of the software test component further comprises
means for interrogating a. definition of the software test component to determine public methods,
constructor and associated parameters for the software test component.

8. The system for generation of a test environment according to claim 7, wherein the means for defining a wrapper component interface comprises means for defining
public methods, constructors and associated parameters in the wrapper component to minor the
public methods, constructors and parameters ascertained for the software test component.

* * * * *

UNITED STATES PATENT AND TRADEMARK OFFICE
CERTIFICATE OF CORRECTION

PATENT NO. : 7,647,584 B2 Page 1 of 1
APPLICATION NO. : 09/772650
DATED : January 12, 2010
INVENTOR(S) : Harm Sluiman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2085 days.

Signed and Sealed this

Sixteenth Day of November, 2010

David J. Kappos
*Director of the United States Patent and Trademark Office*